(12) United States Patent
Smith et al.

(10) Patent No.: US 12,182,749 B2
(45) Date of Patent: Dec. 31, 2024

(54) APPARATUS AND METHODS FOR CLASSIFYING AN ENTITY DATUM INTO INSTRUCTION SETS

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/141,446

(22) Filed: Apr. 30, 2023

(65) Prior Publication Data

US 2024/0362567 A1    Oct. 31, 2024

(51) Int. Cl.
*G06Q 10/0637*    (2023.01)
(52) U.S. Cl.
CPC ............................. *G06Q 10/06375* (2013.01)
(58) Field of Classification Search
None
See application file for complete search history.

(56) References Cited

U.S. PATENT DOCUMENTS

| | | | |
|---|---|---|---|
| 10,496,938 B2 | 12/2019 | Desai | |
| 11,663,397 B1 * | 5/2023 | Stewart | G06F 40/166 704/9 |
| 2020/0175441 A1 * | 6/2020 | Sukhobokov | G06Q 10/06313 |
| 2021/0201412 A1 * | 7/2021 | Goh | G06Q 40/02 |
| 2022/0075793 A1 * | 3/2022 | Jezewski | G06N 5/04 |
| 2022/0199266 A1 * | 6/2022 | Achin | G16H 50/20 |
| 2022/0201042 A1 * | 6/2022 | Crabtree | G06F 16/2477 |
| 2022/0210200 A1 * | 6/2022 | Crabtree | G06F 16/951 |
| 2023/0011954 A1 | 1/2023 | Elserafy | |
| 2023/0020908 A1 * | 1/2023 | Drake | G16H 10/60 |
| 2023/0101451 A1 * | 3/2023 | Dowing | G06Q 10/06375 705/7.37 |

OTHER PUBLICATIONS

Fok, A. W. P., & Ip, H. H. S. (2006). An agent-based framework for personalized learning in continuing professional development. International Journal of Distance Education Technologies, 4(3), 48-56,58-61. (Year: 2006).*

* cited by examiner

*Primary Examiner* — Stephanie Z Delich
(74) *Attorney, Agent, or Firm* — Caldwell Intellectual Property Law

(57) ABSTRACT

An apparatus and method for classifying an entity datum into instruction sets is provided. The apparatus includes processor that may receive the entity data, which includes data describing entity operations and an assessment of operations of each entity. The processor may receive instruction sets including an impact datum describing an effect of a respective instruction set on the entity data and classify elements of data describing assessments into instruction sets. The processor uses a machine learning model including a classifier to correlate data describing the assessment with data describing instruction sets and to generate a user interface. The user interface configures a display device to display a sequence based on classification of elements of data describing assessments of respective instruction sets into at least some instruction sets. The sequence may change a color, or an order based on the impact datum relative to the entity data.

18 Claims, 7 Drawing Sheets

APPARATUS AND METHODS FOR CLASSIFYING AN ENTITY DATUM INTO INSTRUCTION SETS

FIELD OF THE INVENTION

The present invention generally relates to the field of strategic coaching for business planning. In particular, the present invention is directed to an apparatus and methods for data processing relating to classifying an entity datum (e.g., relating to a business) into instruction sets (e.g., forecast data) to provide a user with a progression sequence relating to forward-looking business planning.

BACKGROUND

Strategy development is currently a burdensome process due to a high volume of data. Prior programmatic attempts to resolve this issue have suffered from inadequate user-provided data intake and processing capabilities, and failure to track rapid external changes effectively.

SUMMARY OF THE DISCLOSURE

In an aspect, an apparatus for classifying an entity datum into instruction sets is provided. The apparatus includes a memory communicatively connected to a processor. The memory includes instructions configuring the processor to receive the entity data including data describing entity operations, and data describing an assessment of each operation of each entity. In addition, the memory includes instructions configuring the processor to receive instruction sets, where at least one instruction set includes an impact datum describing an effect of a respective instruction set on the entity data and classify elements of data describing assessments into an instruction sets. The processor uses a machine learning model including a classifier to correlate data describing the assessment with data describing instruction sets and generates an interface query data structure. The interface query data structure configures a remote display device to display a progression sequence based on classification of elements of data describing assessments of respective instruction sets into instruction sets. The progression sequence may change a color, or an order based on at least the impact datum relative to the entity data.

In another aspect, method for classifying an entity datum into instruction sets is provided. The method includes receiving, by a computing device, the entity data comprising data describing entity operations, and data describing an assessment of each operation of each entity. The method also includes receiving, by the computing device, at least some instruction sets. At least one instruction set includes an impact datum describing an effect of a respective instruction set on the entity data. The method also includes classifying, by the computing device, elements of data describing assessments into instruction sets.

The computing device uses a machine learning model including a classifier to correlate data describing the assessment with data describing instruction sets. The method also includes and generating, by the computing device, an interface query data structure. The interface query data structure configures a remote display device to display a progression sequence based on classification of elements of data describing assessments of respective instruction sets into instruction sets, the progression sequence configured to change a color, or an order based on at least the impact datum relative to the entity data.

These and other aspects and features of non-limiting embodiments of the present invention will become apparent to those skilled in the art upon review of the following description of specific non-limiting embodiments of the invention in conjunction with the accompanying drawings.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
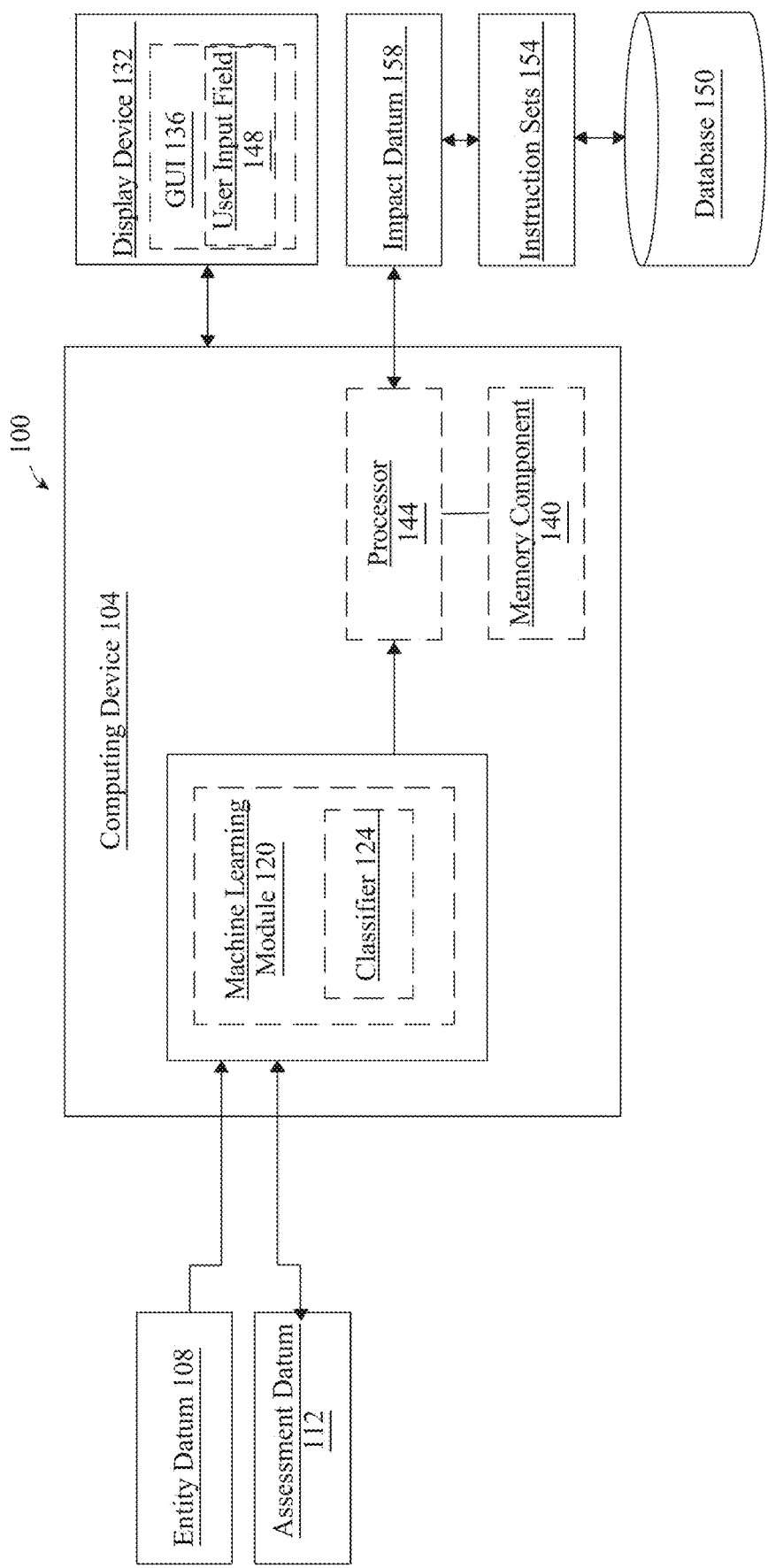
FIG. 1 is a block diagram of an embodiment of an apparatus for data processing relating to classifying an entity datum into instruction sets.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for data processing relating to classifying an "entity data" (e.g., of a business) into "instruction sets" (e.g., forecast data) to display "a progression sequence," defined here a step-by-step business plan prepared exactly for the unique business needs of the identified business in consideration of forecast data. Described processes are executed by a computing device including a processor, which may be configured to execute any one or more of the described steps. Aspects of the present disclosure can be used to classify an entity datum (e.g., of a business) into instruction sets (e.g., forecast data). An entity (e.g., the business) may be represented by the entity data. The entity data may include any information related to formation, operation, expansion, contraction, and/or dissolution of a business throughout all phases of its life cycle, including from inception (e.g., as a start-up) through various funding rounds, if applicable, through to public offerings and other forms of equity grants. The entity data may include data describing prior, current, or future anticipated inventory levels of, for example, goods, such as actual physical merchandise, or services, such as professional service provider availability. More particularly, the entity data may include data describing financial performance of the entity, including (but not limited to) total revenue, profits, losses, expenses, tax exposure, depreciation, and projected future performance indicators. In addition, the entity data may include payroll related information, material and/or personnel transportation costs and related logistics. Also, the entity data may also include ongoing operational costs associated with running or maintaining the entity and may include rent payments, utility bills, property, liability, fire, flood, disaster, and other types of insurance rates, etc.

In some embodiments, the entity data may include data describing a business plan, defined as a formal written document (e.g., provided in paper form or electronic) containing the goals of a business, the methods for attaining those goals, and the timeframe for the achievement of the goals. The business plan may also describe the nature of the business, background information on the organization, the organization's financial projections, and strategies the business intends to implement to achieve the stated targets. In entirety, the business plan document serves a strategy that provides direction to the business. In addition, the business plan may include assessments, such as either a "positive assessment" or a "negative assessment." The business plan may denote activities resulting in revenue increase, repayment delay decrease, or other some other business circumstance favorably impacting the business with "positive assessment." Likewise, descriptions of previous reductions of inventory for cost savings due to decreases in demand may be denoted by a "negative assessment." For example, aspects of a given business plan that, when implemented, caused some orders to be unfulfilled resulting in the business not being able to make those sales may also be denoted with a "negative assessment". In some instances, such prior reductions in inventory may be reflected in the return on capital (ROC) or return on invested capital (ROIC) of the business, which is a ratio used in finance, valuation, and accounting, as a measure of the profitability and value-creating potential of companies relative to the amount of capital invested by shareholders and other debtholders. ROC or ROIC indicates how effective a company is at turning capital into profits. In some instances, the business plan may include information representative of the ROC or the ROIC of the business.

The apparatus includes a memory communicatively connected to a processor, which may be communicatively connected to a server. The memory contains instructions configuring the processor to receive the entity data including data describing entity operations (e.g., business operation data), which may each at least some aspects of the entity data. For example, data describing entity operations may include data describing aspects of logistics of an apparel business. Data describing entity operations may include data describing aspects of inventory storage and maintenance of that apparel business. Persons skilled in the art, upon reviewing the entirety of this disclosure, will be aware of various other aspects suitable to be described by data describing entity operations. In addition, the memory contains instructions configuring the processor to receive data describing an assessment (e.g., such as a "positive assessment" or a "negative assessment" as described above in connection with the business plan of the entity data) of various aspects of data describing entity operations, receive at least some instruction sets, and classify elements of data describing assessments into at least some instruction sets, each referring to forecast data, defined as publicly-available business-related forecasting data including forecasted changes in interest rates, inflation rates, unemployment rates, gross domestic product (GDP), forecasted increases in costs of electricity and fuel, and the like. Also, forecast data may include entity data from other entities correlated to forecasted changes, and may also include data describing geopolitical issues, such as foreign conflicts, natural disasters, etc. In addition, at least one instruction set may include instructions for the entity to change or maintain data describing an output (e.g., a quarterly production level, etc.) of the entity.

In some instances, data describing entity operations includes at least an element of time-sensitive data, such as describing any of the described events (e.g., forecasted increases in costs, geopolitical issues, etc.) The element of time sensitive data may describe events occurring after a triggering event, such as an interest rate change instituted by the Federal Reserve System of the United State (referred to herein as "the Fed"). For example, such later events may include corresponding changes in the Case-Shiller home price index as triggered by the earlier interest rate change, etc. These later events may be described by at least an element of time-sensitive data.

In some embodiments, data describing entity operations may include at least an element of data describing recurring operations and/or parameters describing a maximum condition and a minimum condition. For example, data describing recurring operations may include routine or repetitive shipments of a product on a defined time-interval basis, such as monthly. Examples of products suitable for such routine replenishment may include various types of food, nutritional supplements, shakes, etc.

In addition, at least one instruction set (e.g., forecast data) includes an impact datum describing an impact of a given instruction set on the entity data (e.g., of a business). That is, for example, forecast data may impact aspects of a business. More particularly, in the example of real estate sales, in increase in interest rates (e.g., a type of forecast data) instituted by the Fed may correspondingly cause the Case-Shiller home price index to decrease, which may correspond to decreases in homes listed for sale and decrease home sale transaction volume for residential real estate brokerages (e.g., a type of business), etc.

In addition, the processor uses a machine learning model including a classifier to correlate data describing an assessment (e.g., of various aspects of data describing entity operations, such as a "positive assessment" or a "negative assessment") with data describing at least some instruction sets (e.g., forecast data) and generate a user interface structure. More particularly, the classifier of the machine learning model may correlate data to identify and evaluate an extent of the impact of at least some instruction sets (e.g., forecast data) on the entity data (e.g., of a business) by, for example, correlating and/or comparing various parameters describing the entity data (e.g., business data) to parameters describing at least some instruction sets (e.g., forecast data).

In addition, the machine learning model may be trained by using at least the impact datum and may be either supervised or unsupervised. Also, the machine learning model may run iteratively over multiple iterations. Each iterative cycle of the machine learning model may include a correlation of parameters describing entity operations with parameters describing at least some instruction sets. In some instances, running the machine learning model over multiple iterations may refine the correlation of parameters describing entity operations with parameters describing at least some instruction sets. In addition, the machine learning model may label (e.g., with a descriptive identifier, such as "not very relevant," "medium relevance," or "highly relevant") at least some aspects of data describing entity operations based on a respective assessment relating to ongoing performance as described by the entity data. As a result, in some embodiments, the classifier may correlate data describing the assessment of a respective instruction set with data describing at least some other instruction sets based on one or more labels of respective data describing entity operations. Alternatively, in other embodiments, the classifier may be configured to not correlate at least some data describing assessments with data describing at least some instruction sets. Even further, in some embodiments, the classifier may classify multiple assessments of respective data describing entity operations into other forms of data described with related to the disclosed processes.

The user interface structure configures a remote display device to display a progression sequence based on classification of elements of data describing assessments of respective instruction sets into at least some instruction sets. The progression sequence may change one or more of a color or an order based on at least the impact datum relative to the entity data.

In addition, the remote display device may display various aspects of data describing entity operations based on their respective assessment classifications and/or instruction sets. In some instances, the remote display device may include a graphical user interface (GUI) and may adjust display of at least some instruction sets based on their respective relative importance calculated based on the impact datum and classification of elements of data describing respective assessments. More particularly, in some embodiments, adjustment of display of at least some instruction sets may include adjustment of a prominence of a respective instruction set. Alternatively, in some other embodiments, the user interface structure configures the remote display device to avoid display of at least some instruction sets based on their respective ability to impact corresponding data describing entity operations.

Referring now to FIG. 1, an exemplary embodiment of apparatus 100A for classifying an entity datum into instruction sets is illustrated. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive at least an element of entity datum 108. For the purpose of this disclosure, an "entity datum" is an element, datum, or elements of data describing historical data of a business (e.g., attributes and facts about a business that are already known including, for example, current inventory, total revenue, profit and loss, payroll information, transportation costs, operational expenses, including costs associated with running the business, such as rent, utility bills, insurance rates, etc.). In addition, in some embodiments, entity datum 108 may describe attributes and facts about a business that are "forward-looking," defined here a business-related term used to identify predictions that publicly traded corporations make about future business conditions, restructurings, earnings estimates, and other fundamental company information. Such forward looking attributes and facts may relate to "business ambitions" and "business capabilities" of the entity to attain those ambitions within a defined timeframe. For example, "business ambition," as used herein, is performance-based goalsetting, including increasing shareholder value, decreasing expenses, development of a new product or service, increasing profits, increasing sales volume, and improving customer retention rates. "Business capabilities," in contrast, are defined as the tangible and intangible building blocks of a business that gives it the ability to perform in its intended area of operation. Examples of business capabilities may include recruitment, talent retention, pricing, risk management or product design. Accordingly, entity datum 108 may also describe deficiencies, or "gaps," defined as the difference in performance of a respective entity compared against a benchmark, such as a competitor or a consortium of competitors. In addition, in some embodiments, entity datum 108A may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying an entity datum (e.g., of a business) into instruction sets 154 (e.g., forecast data) in the context of financial services and retirement planning, entity datum 108 may equal "3" for an entity, such as an investment bank stock or mutual fund share, etc., providing an annualized rate of return only slightly exceeding inflation, a "5" for a only exceeding inflation by 2% or less, and an "8" for exceeding 5% or more. Classification of entity datum 108 into instruction sets 154 may include identification of certain business ambitions and business capabilities that are relevant toward reducing or eliminating gaps between operation of a respective business and, for example, its target competitors. In some instances, this may include classification of elements of data, datum, and the like to relevant data within instruction sets 154, which may be specific to a given industry or scenario. For example, in the context of a real estate brokerage seeking to increase annual home sales volume, entity datum 108 relating to a target annual home sales rate may be classified against buyer credit scores and interest rate data such that the real estate brokerage may more efficiently target well-qualified buyers who are more likely to receive financing, if necessary, to complete their intended home purchase transaction.

Alternatively, in other examples where described processes relate to automobile production, entity datum 108A may equal a "3" for performing slightly beneath (e.g., 20%) an enumerated sales or other output performance target, a "5" for achieving exactly the enumerated sales or other output performance target, an "8" for performing slightly above (e.g., 20%) the enumerated sales or other output performance target, or a "10" for greatly exceeding (e.g., 50%+) the enumerated sales or other output performance target. Other example values are possible along with other exemplary attributes and facts about an entity that are already known and may be tailored to a particular situation where explicit business guidance (e.g., provided by the described progression sequence) is sought. In one or more alternative embodiments, entity datum 108 may be described by data organized in or represented by lattices, grids, vectors, etc. and may be adjusted or selected as necessary to accommodate particular entity-defined circumstances or any other format or structure for use as a calculative value that a person skilled in the art would recognize as suitable upon review of the entirety of this disclosure.

In one or more embodiments, entity datum 108A may be provided to or received by computing device 104A using various means. In one or more embodiments, entity datum 108 may be provided to computing device 104A by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human as described here may manually enter entity datum 108 into computing device 104 using, for example, user input field 148 of graphical user interface (GUI) 136 of display device 132. For example, and without limitation, a human may use display device 132 to navigate the GUI 136 and provide entity datum 108 to computing device 104. Non-limiting exemplary input devices include keyboards, joy sticks, light pens, tracker balls, scanners, tablet, microphones, mouses, switches, buttons, sliders, touchscreens, and the like. In other embodiments, entity datum 108 may be provided to computing device 104 by a database over a network from, for example, a network-based platform. Entity datum 108 may be stored, in one or more embodiments, in database 150 and communicated to computing device 104 upon a retrieval request from a human and/or other digital device (not shown in FIG. 1) communicatively connected with computing device 104. In other embodiments, entity datum 108 may be communicated from a third-party application, such as from a third-party application on a third-party server, using a network. For example, entity datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may entity datum 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104A using a machine-learning model, which is described in this disclosure further below.

At a high level, "a machine-learning" describes a field of inquiry devoted to understanding and building methods that "learn"—that is, methods that leverage data to improve performance on some set of defined tasks. Machine learning algorithms may build a machine-learning model based on sample data, known as "training data", to make predictions or decisions without being explicitly programmed to do so. Such algorithms may function by making data-driven predictions or decisions by building a mathematical model from input data. These input data used to build the machine learning model may be divided in multiple data sets. In one or more embodiments, three data sets may be used in different stages of the creation of the machine-learning model: training, validation, and test sets.

Described machine-learning models may be initially fit on a training data set, which is a set of examples used to fit parameters. Here, example training data sets suitable for preparing and/or training described machine learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of instruction sets 134, each instruction set describing data for forecast data influencing the business, e.g., lower interest rates or later-following interest rate increases, etc. In addition, in one or more embodiments, classifier 124 may classify and/or correlates only a select portion of assessments (e.g., one or more instances of assessment datum 112) with data describing at least some instruction sets 154. More particularly, the described processes do not always require that all occurrences of assessment datum are classified and/or correlated with all instruction sets 154. Described processes may classify or correlate select portions of occurrences of assessment datum 112 with select portions of instruction sets 154. In addition, each occurrence of instruction set 154 may not have a corresponding assessment datum 112. Certain instruction sets may be deemed so irrelevant to entity datum 108 so as to receive a minimal assessment datum 112 or no assessment datum 112 at all. As a result, such data may "train" described machine learning processes to iteratively refine data and generate the progression sequence suited to the business in a particular operational condition In one or more embodiments, processor 144 of computing device 104 may be configured to execute described machine learning processes by machine learning module 120 to generate or populate training data, which may include requesting a human or a computer (not shown in FIG. 1) communicatively connected to computing device 104 to input business operational data and/or forecasting conditions through user input field 148 of GUI 136 of display device 132. Human or computer-provided input may be binary in certain circumstance, e.g., a "yes" or "no," or include phrases or sentences provided in text format that the described machine learning processes may recognize using text-recognition or another applicable data processing technique. Human or computer-provided responses may be incorporated into instruction sets 142 to be later iteratively correlated by relative applicability to the business and therefore determine impact datum 158. "Impact datum," as used in this disclosure, is at least an element of data representative of the extent of performance impact of a corresponding instruction set (e.g., a particular type of forecast data, such as interest rates). Such performance impact may be described by data, such that at least some instruction sets 154 will include or be associated with relatively higher values of impact datum 158 indicative of correspondingly higher impact of that instruction set 154 on entity datum 108. For example, should entity datum 108 relate to a real-estate brokerage, instruction sets 154 describing data for interest rate changes may include or associate with impact datum 158 describing relatively higher impact. Such higher impact may be denoted by numerical or other forms of data. In comparison, some instruction sets 154 describing data for general macroeconomic conditions describing foreign trade may be attributed with impact datum 158 having a relatively lower value, since the financial "impact" of foreign trade on the business performance of a real estate brokerage likely is not as significant as a domestic interest rate change. After initial training, described machine learning processes may evaluate impact datum 158 in addition to correlating entity datum 108 with instruction sets 154 to generate and display the described progression sequence. Other types of data sets may also be used by the described machine learning processes to determine fit and predictive ability, such as assessment datum 112 and/or any validation data sets and final one or more test data sets. Assessment datum 112 may be initially calculated by processor 144 based on receipt of entity datum 108 in relation to instruction sets 154 and describe whether a certain instruction set of instruction sets 154 had, for example, a positive, negative, or neutral impact on entity datum 108. Validation data sets may be incrementally more focused toward an identified aspect of objectives of the business that emerge as more prominent than others. For example, in finance, the business may be (as determined by iterative responses to prompts displayed by GUI 136) interested building up cash reserves during down-turn economic conditions, rather than investing in risky new propositions.

In one or more embodiments, database 150 may include inputted or calculated information and data (e.g., data related to entity datum 108, assessment datum 112, impact datum 158, and/or instruction sets 154) related to optimization in performance of the business. In addition, a datum history may be stored in a database 150. Datum history may include real-time and/or previously inputted to entity datum 108, assessment datum 112, impact datum 158, and/or instruction sets 154. In one or more embodiments, database 150 may include real-time or previously determined record recommendations and/or previously provided interaction preparations. Computing device 104 may be communicatively connected with database 132. For example, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "finance" in the instance that a business is seeking to optimize operations in the financial services and/or retirement industry. In another non-limiting example, keywords of a key-phrase may be "luxury vehicle manufacturing" in an example where the business is seeking to optimize market share internationally, or certain rapidly developing markets. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, computing device 104 is further configured to receive entity datum 108, as previously mentioned. For the purposes of this disclosure, "entity datum" includes historical data of the entity. Historical data may include attributes and facts about a user already known, such as current inventory, total revenue, profit and loss, payroll information, transportation costs, operational costs, such as rent, utility bills, insurance rates, and the like. Entity datum 108 may describe textual, audio and/or visual information related to the entity's operational information or attributes. In some embodiments, instructions sets 154 may also describe textual, audio and/or visual information, but relate to forecast data, which may include publicly available business forecasting data, such as forecasted changes in interest rates, inflation rates, unemployment rates, GDP, forecasted increase in costs of electricity and fuel, etc. In addition, described forecast data may include business data from other entities correlated to forecasted changes and may also describe geopolitical issues, such as foreign conflicts, natural disasters, etc. that are relevant to ongoing operation of the business. Instruction sets 154 may be received by computing device 104A by identical or similar means described above for entity datum 108 and/or assessment datum 112. For example, and without limitation, instruction sets 154 may be provided to computing device 104 by a human or computer (not shown in FIG. 1) communicatively connected with computing device 104 through, for example, a third-party application, remote device, immutable sequential listing, etc. Processor 144 may generate the described progression through described machine-learning processes using machine learning module 120, which may include classifier 124. More particularly, in some embodiments, classifier 124 may correlate assessment datum 112 (e.g., referring to one or more elements of data describing assessments of the business) with data describing instruction sets 154 and generate the described progression sequence for the business. Consequently, processor 144 may generate an interface query data structure that may configure display device 132 (e.g., GUI 136 of display device 132) to display the described progression sequence based on classification of elements of data describing assessments (e.g., assessment datum 112) of respective instruction sets 154 into at least some of the instruction sets 154. Also, the display device 132 may display data describing entity operations (e.g., associated with entity datum 108) based on respective assessment classifications. In addition, the progression sequence may change a color, an order, or a prominence based on at least impact datum 158 (e.g., of one or more corresponding instruction sets 154) relative to entity datum 108.

A "classifier," as used in this disclosure is type or operational sub-unit of any described machine learning model or process executed by machine learning module 120, such as a mathematical model, neural net, or program generated by a machine learning algorithm known as a "classification algorithm" that sorts inputs into categories or bins of data, outputting the categories or bins of data and/or labels associated therewith. A classifier may be configured to classify and/or output at least a datum (e.g., entity datum 108, assessment datum 112, instruction sets 154 and/or impact datum 158 as well as other elements of data produced, stored, categorized, aggregated or otherwise manipulated by the described processes) that labels or otherwise identifies a set of data that are clustered together, found to be close under a distance metric, or the like.

Referring again to FIG. 1A, computing device 104A may be configured to identifying business impact by using classifier 125 to correlate entity datum 108, various instances of assessment datum 112 representative of or otherwise associated with entity datum 108 into instruction sets 154 based on impact datum 158. That is, certain forecast data included in instruction sets 154 may be determined by classifier 124 to be more impactful to performance of the business than others. For example, interest rate increases may more directly impact performance of a real-estate brokerage over exotic vehicle sales, which may be bought by wealthy customers using cash only. Therefore, in this example interest rate increase related forecast data may be identified by impact datum 158 as being more impactful to a real estate business. Accordingly, classifier 124 of machine learning module 120 may analytically compare forecast data to business data by, for example, correlating each parameter of business data to parameters of forecast data to correspondingly identify business impact of that forecast data on the business. In addition, in some embodiments, machine learning module 120 performing the described correlations may be supervised. Alternatively, in other embodiments, machine learning module 120 performing the described correlations may be unsupervised. In addition, classifier 124 may label various data (e.g., including entity datum 108, assessment datum 112, impact datum 158 and/or any one or more instruction sets 154) using machine learning module 120. For example, machine learning module 120 may label certain relevant parameters of one or more instances of entity datum 108 with parameters of one or more instruction sets 154. In addition, machine learning processes performed by machine learning module 120 may be trained using one or more instances of impact datum 158 to, for example, more heavily weigh or consider certain instruction sets 154 deemed to be more relevant to the business. More specifically, in one or more embodiments, impact datum 158 may be based on or include correlations of parameters associated with entity datum 108 to parameters of instruction sets 154. In addition, impact datum 158 may be at least partially based on earlier iterations of machine learning processes executed by machine learning module 120. In some instances, running machine learning module 120 over multiple iterations refines correlation of parameters or data describing entity operations (e.g., associated with entity data 108) with parameters describing at least some instruction sets 154.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Resulting from the described or other classification processes, classifier 124 may correlate assessment datum 112 with instruction sets 154. Accordingly, an interface query data structure may be generated by processor 144 and configure user input field 148 of GUI 136 to display the described progression sequence based on classification of elements of data describing assessments of respective instruction sets into at least some instruction sets. In addition, the progression sequence may change a color, an order, or a prominence, based on at least impact datum 158 relative to (e.g., when correlated against or otherwise analytically compared against) entity datum 108. In some instances, in one or more embodiments, the described progression sequence may include any combination of text, digital photos, and/or digital videos describing one or more long-term (e.g., 3 consecutive months, 6 consecutive months, 1 year, 3 consecutive years, etc.) business plans, any one or more of which may include strategies for business growth based on identifying business impact, such as identified by one or more instances of impact datum 158. Such strategies may be received from database 150 and include business plans derived from various forms business-related data. As a result, in some instances, described long-term business plans may include a combination of business plans. For example, an example long-term business plan may include a business plan of reducing inventory orders while fuel prices are forecasted to be higher and a second business plan of increasing orders when fuel is forecasted to decrease in price. In addition, certain example long-term business plans may include recommendation of business plans to avoid, such as business plans with negative assessments included in business data. For example, instruction sets including or relating to business plans for rapid expansion by taking on high amounts of debt through leverage may be marked with a negative assessment during periods of relatively higher interest rates, which may be identified by other instruction sets 154.

Referring now to FIGS. 2A-2B, exemplary embodiments of user input field 148 as displayed by GUI 136 of user input field 148 of display device 132 are illustrated. For example, screen 200A and screen 200B may be examples of user input field 148 and/or GUI 136 and displayed by display device 132, which may be a "smart" phone, such as an iPhone, or other electronic peripheral or interactive cell phone, tablet, etc. Screen 200A may be a screen initially displayed to a user (e.g., a human as described earlier), and have user engagement area 208 including identification field 204A, assessment field 212A, instruction set field 216A, impact datum field 220A and relationship modeling field 224A. Persons skilled in the art, upon reviewing the entirety of this disclosure, will be aware of various ways in which fewer or additional interactive user input fields may be displayed by screen 208A. Identification field 204A may identify described processes performed by processor 144 of computing device 104 by displaying identifying indicia, such as "Descriptions of Entity Operations" as shown in FIG. 2A to permit, for example, a human to interact with GUI 136 and input information relating to a business, through (for example) interactivity provided by identification field 204A. Such information can include data describing geographical locations where the business operates, or the field of business in which the business operates, etc. A human may select from one or more options (not shown in FIG. 2A) relating to prompts provided by identification field 204A to input such information relating to specific details of the business. In addition, in some embodiments, any of the described fields including (but not limited to) identification field 204A, assessment field 212A, instruction set field 216A, impact datum field 220A, and/or relationship modeling field 224A may include interactive features, such as prompts, permitting for a human to select additional textual and/or other digital media options further identifying or clarifying the nature of the business relating to the respective specifics of that field. For example, assessment field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine learning module 120 and thereby correspondingly appear in the described progression sequence.

Similar to screen 200A, screen 200B may be an example of a screen subsequently shown to a human as described earlier based on human-provided input to any one or more of the displayed fields (e.g., identification field 204A, assessment field 212A, instruction set field 216A, impact datum field 220A, and/or relationship modeling field 224A). That is, screen 200B may display "progression sequence" in identification field 204B as indicating completion of intake of human-provided input and that described machine-learning processes have completed described correlation processes to output progression sequence 208B. For example, in one or more embodiments, progression sequence 208B may also include multiple human-interactive fields, including first business strategy field 212B, second business strategy field 216B, a third business strategy field 220B, and fourth business strategy field 220C. Persons skilled in the art, upon reviewing the entirety of this disclosure, will be aware of various ways in which fewer or additional interactive human input fields may be displayed by screen 200B. Each field within progression sequence 208B may display any combination of human interactive text and/or digital media, each field intending to provide specific data-driven feedback directed to optimizing ongoing business performance of the business. Various example types of specifics (e.g., "eliminate redundant personnel") are shown in progression sequence 208B, but persons skilled in the art will be aware of other example types of feedback, each of which being generated as suitable for a given business by processor 144. In addition, in one or more embodiments, any one or more fields of progression sequence 208B may be human-interactive, such as by posing a query for the human to provide feedback in the form of input such that described machine learning processes performed by machine learning module 120 may intake refined input data and correspondingly process related data and provide an updated progression sequence 208B. In some embodiments, such processes may be performed iteratively, thereby allowing for ongoing refinement, redirection and optimization of progression sequence 208B to better meet the needs of the business.

Figure 3:
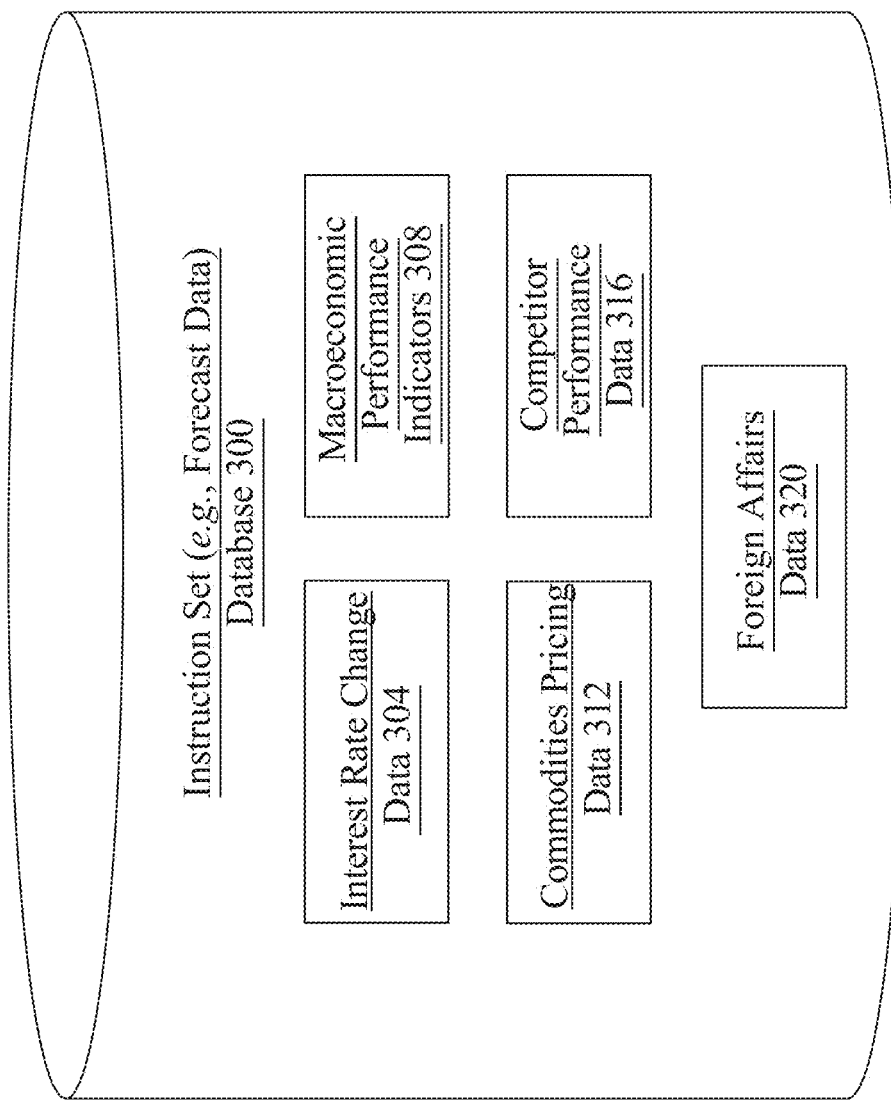
FIG. 3 is a diagrammatic representation of a query database.

Referring now to FIG. 3, an exemplary embodiment of instruction set database 300 is illustrated. In one or more embodiments, instruction set database 300 may be an example of database 150 of FIG. 1. Instruction set database 300 may, as a non-limiting example, organize data according to one or more database tables, which may be linked to one another by, for instance, common column values. For instance, a common column between two tables within instruction set database 300 may include a label affixed to one or more instruction sets 154 and/or entity datum 108. As a result, a query may be able to retrieve all rows from any table pertaining to a given submission or set thereof. Other columns may include any other category usable for organization or subdivision of data describing instruction sets 154, including types of query data, identifiers of interface query data structures relating to obtaining information from the user, times of submission, or the like. Persons skilled in the art, upon reviewing the entirety of this disclosure, will be aware of various ways in which query data from one or more tables may be linked and/or related to query data in one or more other tables. In addition, in one or more embodiments, computing device 104 may be configured to access and retrieve one or more queries from query database 300. Each query may include data describing one or more interface query data structures as descried earlier and include data describing retrieval of one or more instruction sets 154 and correlation thereof with entity datum 108 as associated with generation of the progression sequence as described.

Still referring to FIG. 3, one or more database tables in instruction set database 300 may include, as a non-limiting example, multiple categories including specific types of instruction sets (e.g., forecast data). In the example shown by FIG. 3, example categories may include interest rate change data 304, macroeconomic performance indicators 308, commodities pricing data 312, competitor performance data, and foreign affairs data 320. Each category shown in instruction set database 300 of FIG. 3 may include corresponding data describing instruction sets that may be retrieved by processor 144 to perform any of the described processes. That is, interest rate change data 304 may include data describing interest rate changes; macroeconomic performance indicators 308 may include data describing gross domestic product (GDP) on an annual basis; commodities pricing data 312 may include fuel and other transportation costs; competitor performance data 316 may include competitor sales information and market share, etc.; and, foreign affairs data may include data descriptions of foreign geopolitical occurrences that are likely to impact ongoing performance of the business.

As described here, data included by described categories may be quantified or, in other embodiments, non-quantifiable and suitable for recognition by audiovisual speech recognition (AVSR) processes to recognize verbal (e.g., dictation) content as described here or other processes for subsequent data retention, storage, and processing by computing device 104.

In an embodiment, and referring to FIGS. 1 and 3, computing device 104 may access, categorize, and/or sort data stored by any described category including interest rate change data 304, macroeconomic performance indicators 308, commodities pricing data 312, competitor performance data, and foreign affairs data 320. The described examples are for illustrative purposes only, in that a person skilled in the art would recognize fewer, greater and/or other categories may be defined in instruction set database 300 as being suitable for usage with described processes for generation of the progression sequence upon review of the entirety of this disclosure. In addition, in one or more embodiments, data associated with completion of processes described earlier by processor 144 in relation to generation of progression sequence 208B of FIG. 2B may include attributes may be conveyed implicitly within a video interface query data structure or video-recorded responses thereto. Digital video may be compressed to optimize speed and/or cost of transmission of video. Videos may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

In some cases, computing device 104 may include audiovisual speech recognition (AVSR) processes to recognize verbal content in a video interface query data structure. For example, computing device 104 may use image content to aid in recognition of audible verbal content such as viewing user move their lips to speak on video to process the audio content of video-recorded responses to a vide interface query data structure. AVSR may use image component to aid the overall translation of the audio verbal content of video resumes. In some embodiments, AVSR may include techniques employing image processing capabilities in lip reading to aid speech recognition processes. In some cases, AVSR may be used to decode (e.g., recognize) indeterministic phonemes. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficient (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is "on camera."

In some cases, computing device 104 may be configured to recognize at least a keyword as a function of visual verbal content. In some cases, recognizing at least keyword may include an optical character recognition (OCR). In some cases, computing device 104 may transcribe much or even substantially all verbal content from video-recorded responses to a video interface query data structure. Alternatively, computing device 104 may use OCR and/or intelligent character recognition (ICR) may recognize written text one glyph or character at a time, for instance by employing machine-learning processes. In some cases, intelligent word recognition (IWR) may recognize written text, one word at a time, for instance by employing machine-learning processes in a variety of user-uploaded digital content, including videos, photos, scans of documents with text and/or the like.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a prior knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

In one or more embodiments, apparatus 100 may further include a memory component 140, which may be communicatively connected to computing device 104 and may be configured to store information and/or datum related to apparatus 100. More particularly, in some embodiments, memory component 140 is communicatively connected to processor 144 and configured to contain instructions configuring processor 144 to generate and/or display progression sequence 208B as described. Memory component 140 may be configured to store information, datum, and/or elements of data related to generation of progression sequence 208B. For example, memory component 140 may store previously prepared records (e.g., video recordings of human responses to interface query data structures presented in video format, etc.), customized records generated by computing device 104. In one or more embodiments, memory component 140 may include a storage device, as described further in this disclosure below.

In one or more embodiments, display device 132 may be communicatively connected to computing device 104. Display device 132 may be remote to computing device 104 or integrated into computing device 104. Communication between computing device 104 and display component may be wired or wireless. In one or more embodiments, display device 132 may be configured to display any one or more of entity datum 108, assessment datum 112, data associated with or describing machine learning module 120 and/or classifier 124. Display device 128 may include GUI 136 that a human as described earlier may use to navigate through presented data or information by computing device 104. In one or more embodiments, GUI 136 may include a plurality of lines, images, symbols, and the like to show information and/or data. In non-limiting embodiments, display device 132 may include a smartphone, tablet, laptop, desktop, monitor, tablet, touchscreen, head-up display (HUD), and the like. In one or more embodiments, display device 132 may include a screen such as a liquid crystal display (LCD) various other types of displays or monitors, as previously mentioned in this disclosure. In one or more embodiments, user may view information and/or data displayed on display device 132 in real time. In one or more embodiments, display device 132 may display received or determined information (e.g., by processor 144), which may be toggled through using, for example, an input device of display component or computing device 104. Display device 132 may include electronic components utilized to display image data or information, such as a video, GUI, photo, and the like.

Figure 4:
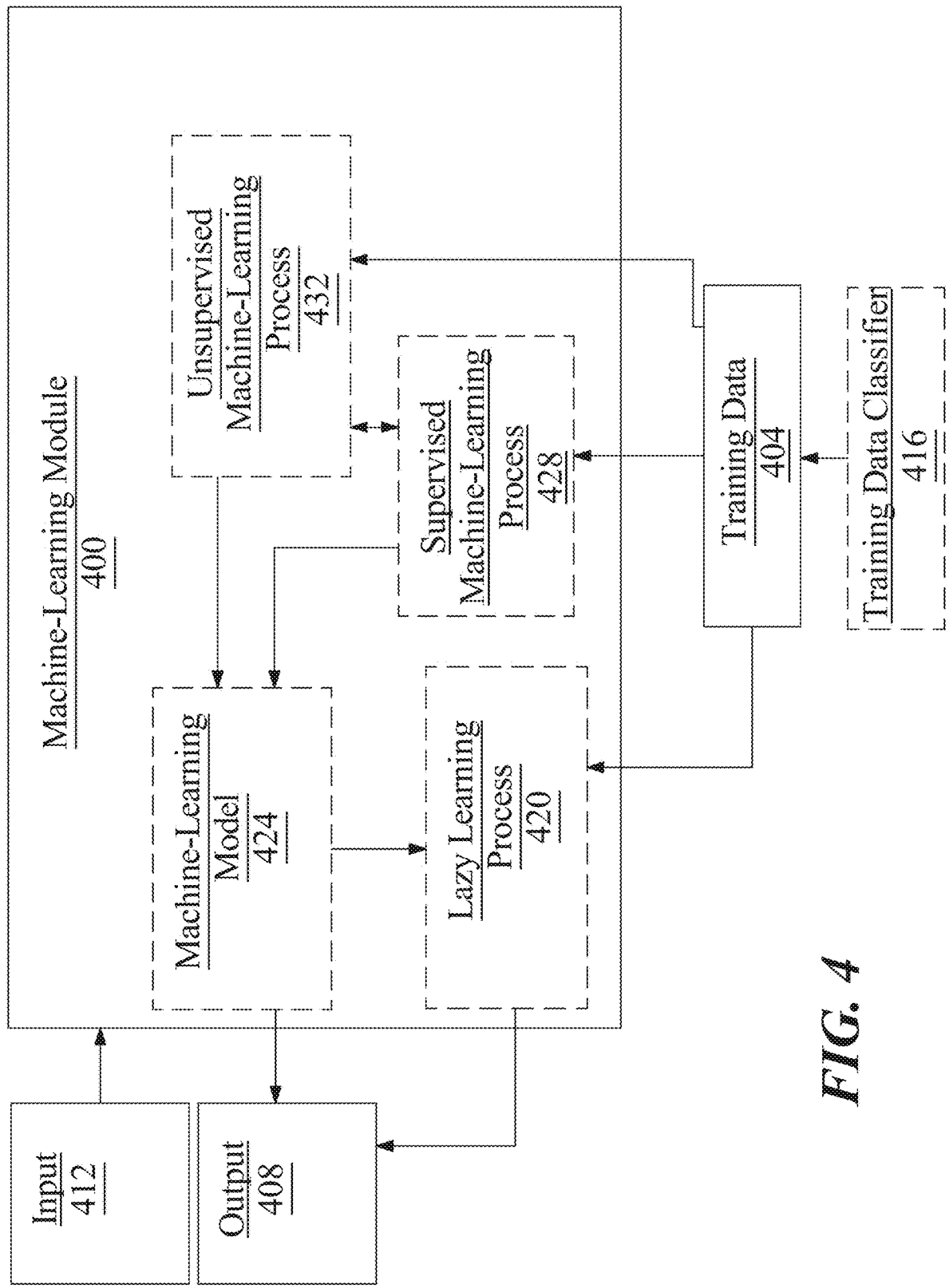
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine learning module 120 of computing device 104 of FIG. 1. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module (e.g., computing device 104 of FIG. 1) to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, each entry representing a set of data elements that were recorded, received, and/or generated together; data elements may be correlated by shared existence in each data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include entity datum 108, assessment datum 112, impact datum 148 and/or instruction sets 154, any one or more of which may be processed as described to provide progression sequence 208B of FIG. 2B. In one or more embodiments, an interface query data structure generated by processor 144 of computing device 104 of FIG. 1 may include one or more interface query data structures, any one of which may include an interface that defines a set of operations supported by a data structure and related semantics, or meaning, of those operations. For example, in the context of classifying an entity datum into instruction sets for generation of the described progression sequence, one or more interface query data structures may appear to a human as described in the form of one or more text-based or other digital media-based surveys, questionnaires, lists of questions, examinations, descriptions, etc., any one of which may include categorical questions in one or more discrete categories including morale, momentum, motivation, and multipliers.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of one or more instances of entity datum and/or one or more instances of assessment datum to instruction sets 154 as identified by their respective impact datum and correspondingly iteratively generate progression sequence 208B the business's needs more accurately for optimizing business operations. That is, in one or more embodiments, in the context of financial services and retirement, training data may include data describing average returns on investment on an annualized basis throughout various market conditions. This input may then be analyzed by machine learning module 120 such that classifier 124 may correlate data describing assessment datum 112 with data describing at least some instruction sets 154. This correlation may result in processor 144 generating an interface query data structure to configure display device 132 to display progression sequence 208B based on classification of elements of data describing assessments (e.g., assessment datum 112) of respective instruction sets 154 into at least some instruction sets 154. In addition, progression sequence 208B may change a color or an order based on at least impact datum 158 relative to entity datum 108.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum (e.g., a personal performance data output for improving a confidence level of the user). As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include entity datum 108, assessment datum 112, impact datum 148 and/or instruction sets 154 and/or associated data describing related textual and/or visual imagery (e.g., digital photos and/or videos) relating to classifying entity datum 108 into instruction sets 154 configuring display device 132 to display progression sequence 208B of FIG. 2, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
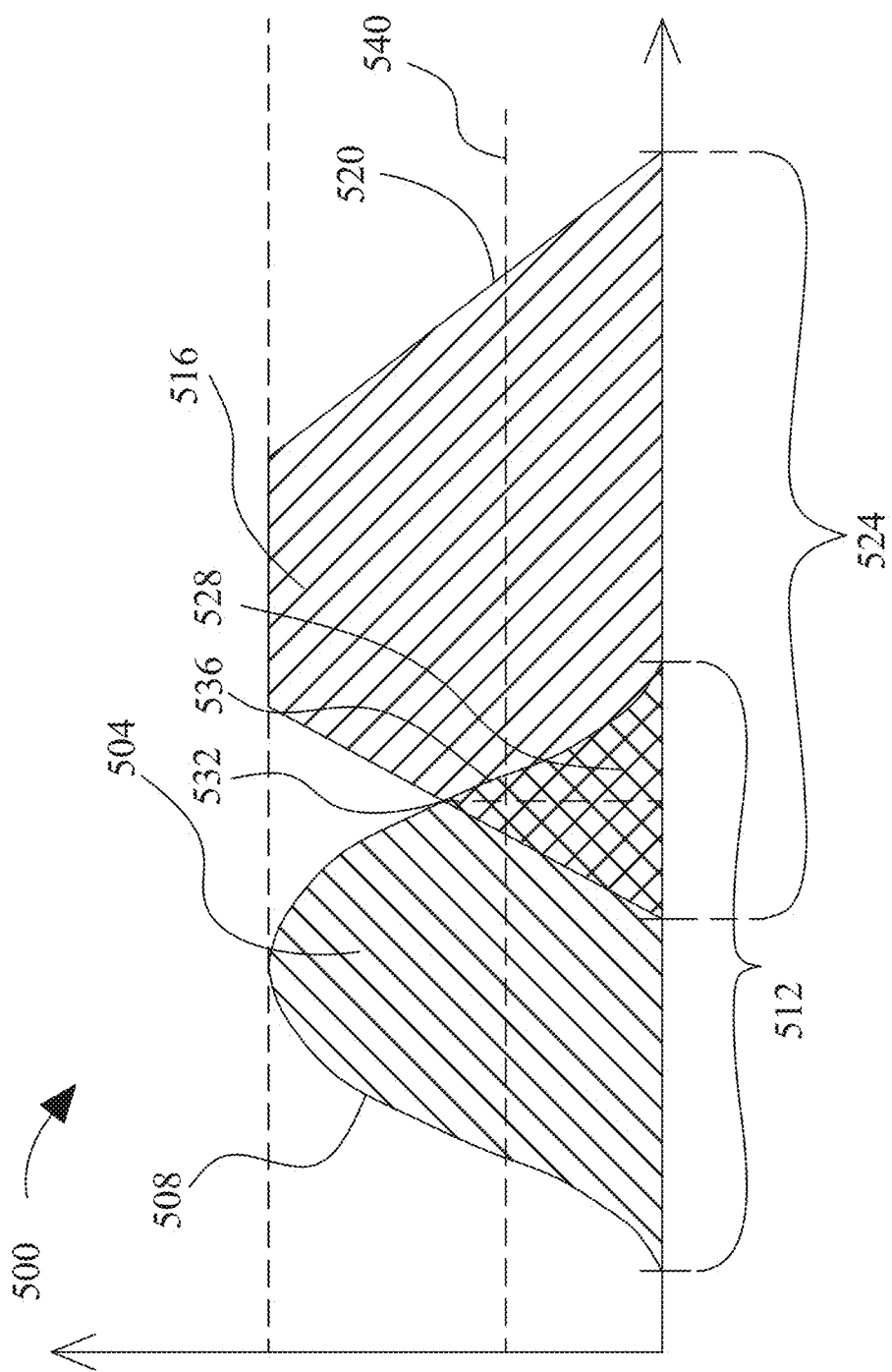
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a personal performance data output (e.g., for improving a confidence level of a user) as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, entity datum 108, assessment datum 112, impact datum 148 and/or instruction sets 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Figure 2:
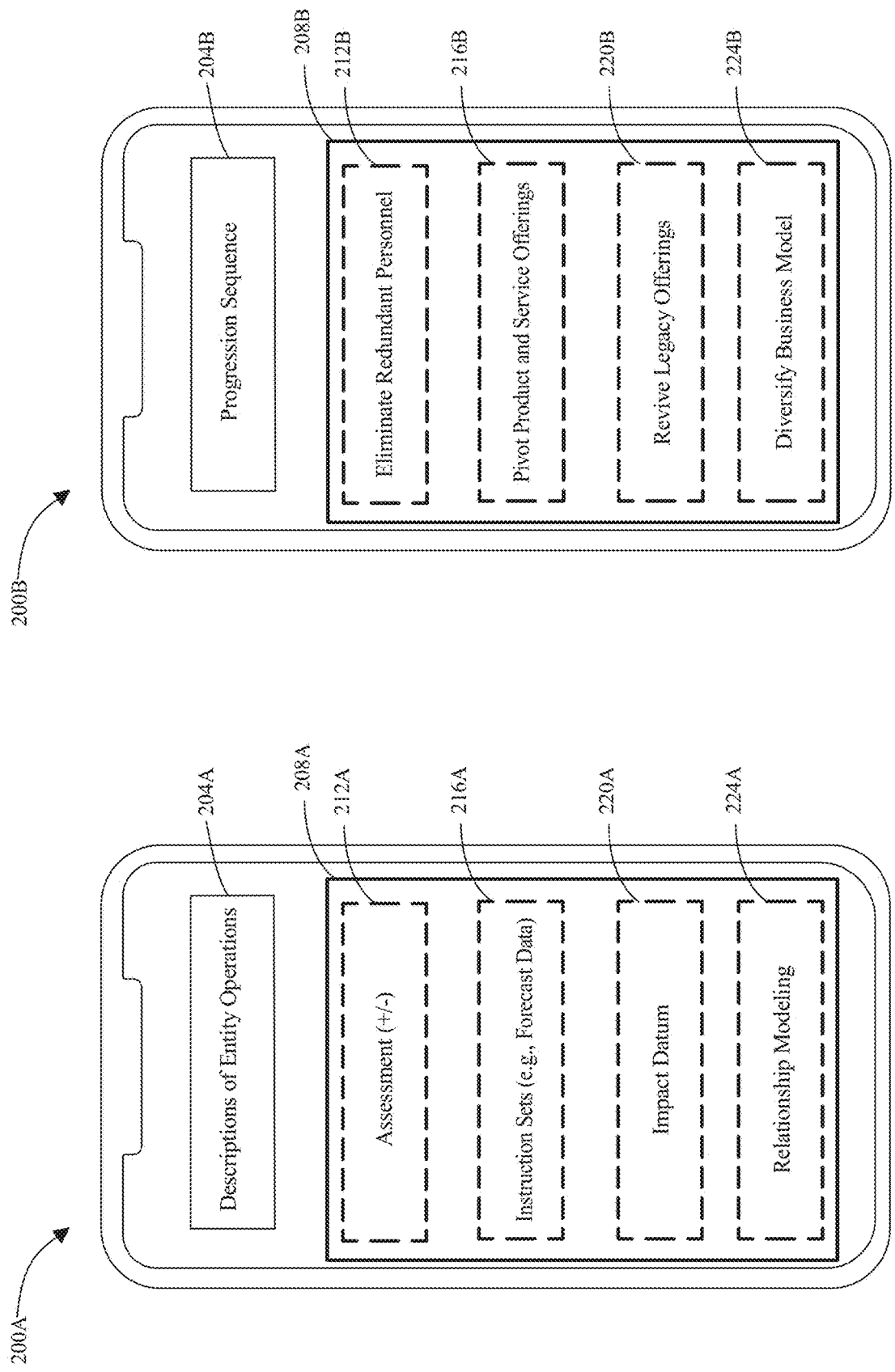
FIGS. 2A-2B are diagrammatic representations of multiple exemplary embodiments of the display device of FIG. 1.

Still referring to FIG. 5, first fuzzy set 504 may represent any value or combination of values as described above, including output from one or more machine-learning models, entity datum 108 and/or assessment datum 112, and a predetermined class, such as without limitation, query data or information including interface query data structures stored in query database 200 of FIG. 2. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from, for example, any one or more described machine learning processes executed by machine learning module 120 and/or associated with entity datum 108, assessment datum 112, impact datum 148 and/or instruction sets 154 and.or a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify entity datum 108 and/or assessment datum 112 with interface query data structure data stored in instruction sets 154. For instance, if entity datum 108 and/or assessment datum 112 has a fuzzy set matching certain interface query data structure data values stored in query database 200 (e.g., by having a degree of overlap exceeding a threshold), computing device 104 may classify entity datum 108 and/or assessment datum 112 as belonging and/or corresponding to one or more instruction sets 154. Where multiple fuzzy matches are performed, degrees of match for each respective fuzzy set may be computed and aggregated through, for instance, addition, averaging, or the like, to determine an overall degree of match.

Still referring to FIG. 5, in an embodiment, entity datum 108 and/or assessment datum 112 may be compared to multiple instruction set database 300 categorization fuzzy sets. For instance, entity datum 108 and/or assessment datum 112 may be represented by a fuzzy set that is compared to each of the instruction set database 300 categorization fuzzy sets (e.g., for each of interest rate change data 304, macroeconomic performance indicators 308, commodities pricing data 312, competitor performance data 316, and/or foreign affairs data 320, etc.); and a degree of overlap exceeding a threshold between entity datum 108 and/or assessment datum 112 fuzzy set and any of instruction set database 300 categorization fuzzy sets may cause computing device 104 to classify entity datum 108 and/or assessment datum 112 as belonging to one or more corresponding interface instruction set data structures associated with instruction set database 300 categorization. For instance, in one embodiment there may be two instruction set database 300 categorization fuzzy sets, representing, respectively, instruction set database 300 categorization (e.g., into each of interest rate change data 304, macroeconomic performance indicators 308, commodities pricing data 312, competitor performance data 316, and/or foreign affairs data 320, etc.). For example, a First instruction set database 300 categorization may have a first fuzzy set; a Second instruction set database 300 categorization may have a second fuzzy set; and entity datum 108 and/or assessment datum 112 may each have a corresponding fuzzy set. Computing device 104, for example, may compare entity datum 108 and/or assessment datum 112 fuzzy set with fuzzy set data describing each of the categories included instruction set database 300, as described above, and classify entity datum 108 and/or assessment datum 112 to one or more categories (e.g., interest rate change data 304, macroeconomic performance indicators 308, commodities pricing data 312, competitor performance data 316, and/or foreign affairs data 320, etc.). Machine-learning methods as described throughout may, in a non-limiting example, generate coefficients used in fuzzy set equations as described above, such as without limitation x, c, and σ of a Gaussian set as described above, as outputs of machine-learning methods. Likewise, entity datum 108 and/or assessment datum 112 may be used indirectly to determine a fuzzy set, as entity datum 108 and/or assessment datum 112 may be derived from outputs of one or more machine-learning models that take entity datum 108 and/or assessment datum 112 directly or indirectly as inputs.

Still referring to FIG. 5, a computing device may use a logic comparison program, such as, but not limited to, a fuzzy logic model to determine an instruction set database 300 response. A query database 200 response may include, but is not limited to, interest rate change data 304, macroeconomic performance indicators 308, commodities pricing data 312, competitor performance data 316, and/or foreign affairs data 320, etc., and the like; each instruction set database 300 response may be represented as a value for a linguistic variable representing instruction set database 300 response or in other words a fuzzy set as described above that corresponds to a degree of matching between data describing entity datum 108 and/or assessment datum 112 and one or more categories within instruction set database 300 as calculated using any statistical, machine-learning, or other method that may occur to a person skilled in the art upon reviewing the entirety of this disclosure. In some embodiments, determining an instruction set database 300 categorization may include using a linear regression model. A linear regression model may include a machine learning model. A linear regression model may be configured to map data of entity datum 108 and/or assessment datum 112, to one or more instruction set database 300 parameters. A linear regression model may be trained using a machine learning process. A linear regression model may map statistics such as, but not limited to, quality of entity datum 108 and/or assessment datum 112. In some embodiments, determining instruction set database 300 of entity datum 108 and/or assessment datum 112 may include using an instruction set database 300 classification model. An instruction set database 300 classification model may be configured to input collected data and cluster data to a centroid based on, but not limited to, frequency of appearance, linguistic indicators of quality, and the like. Centroids may include scores assigned to them such that quality of entity datum 108 and/or assessment datum 112 may each be assigned a score. In some embodiments, instruction set database 300 classification model may include a K-means clustering model. In some embodiments, instruction set database 300 classification model may include a particle swarm optimization model. In some embodiments, determining instruction set database 300 of entity datum 108 and/or assessment datum 112 may include using a fuzzy inference engine (e.g., to assess the progress of the user and use said data to amend or generate new strategies based on user progress). A fuzzy inference engine may be configured to map one or more entity datum 108 and/or assessment datum 112 data elements using fuzzy logic. In some embodiments, entity datum 108 and/or assessment datum 112 may be arranged by a logic comparison program into instruction set database 300 arrangement. A "instruction set database 300 arrangement" as used in this disclosure is any grouping of objects and/or data based on skill level and/or output score as defined by, for example, scoring as described for machine learning processes performed by machine learning module 120 of FIG. 1. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to entity datum 108 and/or assessment datum 112, such as a degree of matching between data describing user aspirations and strategies based on responses to interface query data structures stored in instruction set database 300. Continuing the example, an output linguistic variable may represent, without limitation, a score value. An inference engine may combine rules, such as: "if the Federal Reserve increases its fed funds target rate range to 5%; or, if market share exceed 2%, etc.,—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Further referring to FIG. 5, entity datum 108 and/or assessment datum 112 may be selected by user (human) selection, and/or by selection of a distribution of output scores, such as 50% correlating with business condition levels, such as "hard/expert", 40% to "moderate/average", and 50% easy/beginner levels or the like. Each instruction set database 300 categorization may be selected using an additional function such as in instruction set database 300 as described above.

Figure 6:
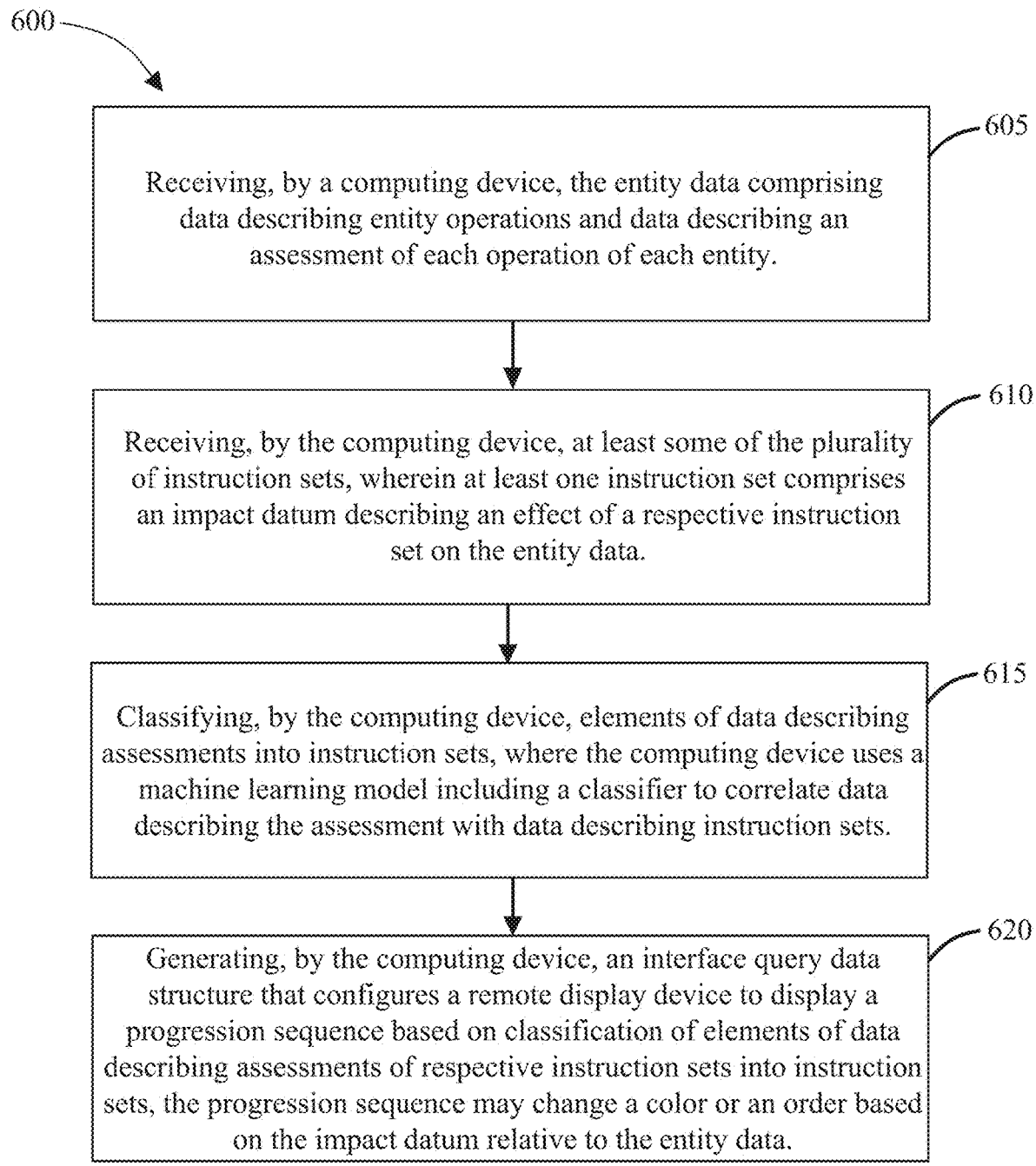
FIG. 6 is a flow diagram of an exemplary method for classifying an entity datum into a plurality of instruction sets.

Now referring to FIG. 6, a method 600 for classifying an entity data into instruction sets for generating an interface query data structure that configures a remote display device (e.g., display device 132 of FIG. 1) to display a progression sequence (e.g., progression sequence 208B of FIG. 2B) is presented. At step 605, method 600 includes receiving, by computing device 104, entity datum 108 (of FIG. 1) including data describing entity operations, and data describing assessment datum 112 of each operation of each entity.

As described earlier, entity datum 108 may describe any information related to a business. In some embodiments, one or more instances of entity datum 108 may be received by computing device 104. Entity datum 108 may describe information related to, for example, total revenue, profit and loss, payroll information, transportation costs, and operational costs, such as costs associated with running the business, such as rent, utility bills, insurance rates, and the like. In some instances, entity datum 108 may include a business or organizational operational plan, referring to a sequence of actions taken to attain the goals of a business. In addition, in some embodiments, computing device 104 may receive one or more instances of assessment datum 112, which may describe, for example, a positive, negative, or neutral effect of data describing a business plan within entity datum 108 on running the business. That is, for example, a business plan may designate a previous reduction of inventory to save money with a negative assessment, thereby indicating that the plan caused some orders to be unfulfilled, thus not making those sales. In contrast, rapid customer increases in demand due to, for example, low interest rates to encourage consumer spending, may be labeled with a positive assessment. In addition, aspects of a business plan that do not have a discernable impact on the performance of the business may be labeled with a neutral assessment. Those skilled in the art, upon reviewing the entirety of this disclosure, will be aware of various other ways in other types of labels, including intermediary labels in between multiple assessment designations, such as "neutral-to-positive," or "negative-to-neutral," etc., may also be used by the described processes. This step may be implemented as described above, without limitation, in FIGS. 1-7.

Still referring to FIG. 6, at step 610, method 600 includes receiving, by computing device 104, at least some instruction sets 154 of FIG. 1, where at least one instruction set includes impact datum 158 describing an effect of a respective instruction set (e.g., of instruction sets 154) on entity data 108. As described earlier, instruction sets 154 may each include data describing forecast data. For example, forecast data may include publicly available business forecasting data, such as forecasted changes in interest rates, inflation rates, unemployment rates, GDP, forecasted increase in costs of electricity and fuel, and the like. In addition, forecast data may include business data from other entities correlated to forecasted changes. Forecast data may also include data relating to include geopolitical issues, such as foreign conflicts, natural disasters, and the like. In addition, one or more instruction sets of instruction sets 154 received by computing device 104 may include impact datum 158 describing an effect of a respective instruction set on entity datum 108. For example, an instruction set relating to interest rate increases for an example entity datum 108 relating to a real estate brokerage may indicate that impact datum 158 is relatively high, or significant. This significance of impact datum 158 may be later evaluated and/or magnified by described machine learning processes executed by machine learning module 120. Alternatively, in one or more other embodiments, the same instruction set relating to interest rate increases for an example entity datum 108 relating to luxury travel may indicate that impact datum 158 is relatively low, or insignificant, assuming that wealthy travelers are not relying on access to debt to finance travel, etc. Persons skilled in the art, upon reviewing the entirety of this disclosure, will be aware of various other ways in which impact datum 158 may be different for different scenarios or circumstances relating to entity datum 108. This step may be implemented as described above, without limitation, in FIGS. 1-7.

Still referring to FIG. 6, at step 615, method 600 includes classifying, by the computing device, elements of data describing assessments (e.g., assessment datum 112) into at least some instruction sets 154. More particularly, computing device 104 uses machine learning module 120 including classifier 124 to correlate data describing assessment datum 112 with data describing instruction sets 154. Such correlation processes may be performed as described earlier, such as for machine-learning processes performed by machine learning module 120. For example, in one or more embodiments, described correlation processes may identify unique relationships within any form of data discussed in the present disclosure. Identified relationships can lead to generation of progression sequence 208B being more relevant to, for example, the needs of a particular business facing certain operational circumstances. Returning to the real estate brokerage example, instruction sets 154 relating to various types of relevant financial forecast data, including interest rate increases, bank failures, government intervention in the form of bailouts, etc., may be correlated by classifier 124 into data describing operational specifics of the real estate brokerage that are, for example, particularly reliant on that form of forecast data to perform favorably. For example, artificially reduced interest rates to stimulate consumer spending may result in less-qualified buyers receiving favorable financing packages and thereby qualify for larger mortgages, resulting in higher home sales volume for the real estate brokerage. As a result, data describing interest rates from instruction sets 154 may be correlated into data describing mortgage applicant approval rates to, and, because of such correlation, generate progression sequence 208B that more closely addresses the real-estate brokerage's needs in view of current macroeconomic conditions. This step may be implemented as described above, without limitation, in FIGS. 1-7.

Still referring to FIG. 6, at step 620, method 600 includes generating, by computing device 104, an interface query data structure that configures a remote display device to display progression sequence 208B based on classification of elements of data describing assessments (e.g., assessment datum 112) of respective instruction sets 154 into at least some instruction sets 154. In addition, progression sequence 208B may change a color or an order (e.g., and/or some other form of indication, such as prominence, etc.) based on at least the impact datum relative to the entity data. More particularly, as described in connection with step 615, classifier 124 may correlate related data into one another or otherwise identify meaningful patterns and relationships within data. Progression sequence 208B may be based on (e.g., generated in response to) such correlations. For example, returning to the context of a real-estate brokerage, progression sequence 208B may display strategies relating to maximizing home sales volume and/or individual home selling price in response to instruction sets 154 including data describing indications of artificially suppressed interests rate data. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that can store and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
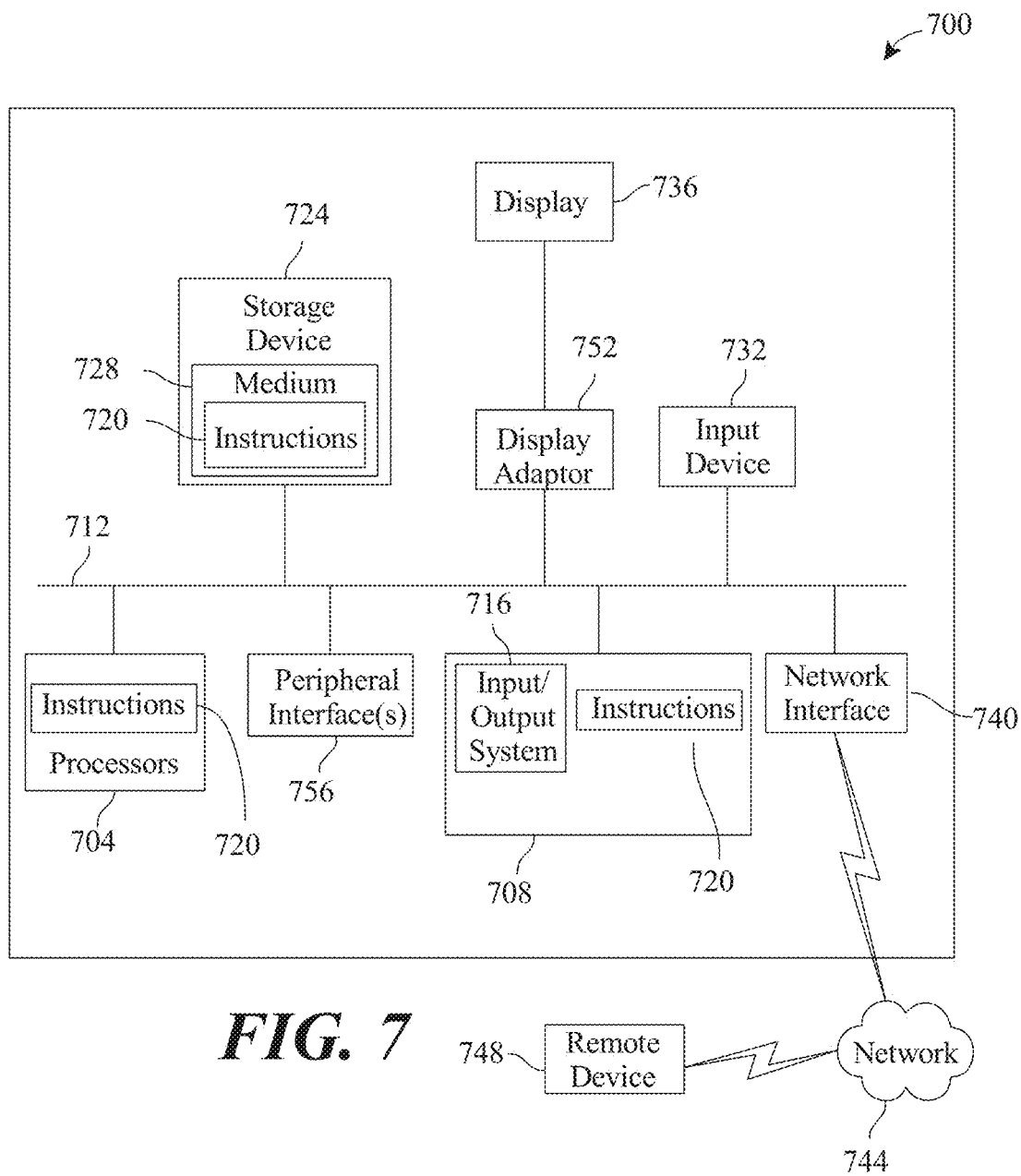
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for classifying an entity datum, the apparatus comprising:
a memory communicatively connected to a processor, the memory containing instructions configuring the processor to:
receive entity data, wherein the entity data comprises:
forward-looking attributes related to the entity;
data describing entity operations; and
data describing an assessment of each operation of each entity;
generate a plurality of instruction sets from a plurality of multimedia information using an audiovisual speech recognition process, wherein at least one instruction set comprises an impact datum describing an effect of a respective instruction set on the entity data;
classify elements of data describing a plurality of assessments into at least some of the plurality of instruction sets, wherein the classification comprises:
iteratively training a machine learning model using a plurality of training data, wherein the machine learning model is a neural network, wherein iteratively training the machine learning model further comprises:
using training data applied to an input of nodes comprising at least a plurality of assessments correlated to the plurality of instruction sets, one or more intermediate layers of nodes, and an output layer of nodes comprising at least a quarterly production level;
adjusting one or more connections and one or more weights between nodes in adjacent layers of the machine learning model, wherein adjusting the one or more connections and one or more weights comprises utilizing a scoring function configured to maximize a probability that an input layer of nodes is associated with the output layer of nodes;
detecting additional correlations between the output layer of nodes and the input layer of nodes;
iteratively training the machine learning model as a function of the additional correlations;
generate an interface query data structure, wherein:
the interface query data structure configures a remote display device to display a progression sequence based on classification of elements of data describing assessments of respective instruction sets into at least some of the plurality of instruction sets, the progression sequence is configured to change color or order based on at least the impact datum relative to the entity data;
the interface query data structure configures the remote display device to receive, at an impact datum field, an updated impact datum from a user;
retrain the machine-learning model using the updated impact datum by adjusting the plurality of training data connections between layers of the plurality of nodes of the machine learning model based on the updated impact datum;
generate an updated classification of the data to describe an updated plurality of instruction sets using the retrained machine-learning model; and
modify the interface query data structure using the updated plurality of instruction sets.

2. The apparatus of claim 1, wherein data describing entity operations comprises at least an element of time-sensitive data.

3. The apparatus of claim 1, wherein the machine learning model is configured to classify multiple assessments of respective data describing entity operations.

4. The apparatus of claim 3, wherein the remote display device is configured to display data describing entity operations based on respective assessment classifications.

5. The apparatus of claim 1, wherein data describing entity operations comprises at least an element of data describing recurring operations.

6. The apparatus of claim 1, wherein data describing entity operations comprises parameters describing a maximum condition.

7. The apparatus of claim 1, wherein data describing entity operations comprises parameters describing a minimum condition.

8. The apparatus of claim 1, wherein the machine learning model is supervised or unsupervised.

9. The apparatus of claim 8, wherein running the machine learning model over multiple iterations refines correlation of parameters data describing entity operations with parameters describing at least some of the plurality of instruction sets.

10. The apparatus of claim 1, wherein the machine learning model is configured to run iteratively over multiple iterations.

11. The apparatus of claim 1, wherein an entity is represented by the entity data and the plurality of instruction sets includes data describing an output.

12. The apparatus of claim 11, wherein the machine learning model correlates data describing the assessment with data describing at least some of the plurality of instruction sets based on one or more labels of respective data describing entity operations.

13. The apparatus of claim 1, wherein the machine learning model is configured to label data describing entity operations based on a respective assessment.

14. The apparatus of claim 1, wherein the interface query data structure configures the remote display device to display a graphical user interface (GUI).

15. The apparatus of claim 1, wherein the interface query data structure configures the remote display device to avoid display of at least some of the plurality of instruction sets based on their respective ability to impact corresponding data describing entity operations.

16. The apparatus of claim 15, wherein the machine learning model correlates only a select portion of the plurality of assessments with data describing at least some of the plurality of instruction sets.

17. A method for classifying an entity datum, the method comprising:
   receiving, by a computing device, entity data, wherein the entity data comprises:
      forward-looking attributes related to the entity;
      data describing entity operations; and
      data describing an assessment of each operation of each entity;
   generating, by the computing device, at least some of a plurality of instruction sets from a plurality of multimedia information using an audiovisual speech recognition process, wherein at least one instruction set comprises an impact datum describing an effect of a respective instruction set on the entity data;
   classifying, by the computing device, elements of data describing a plurality of assessments into at least some of the plurality of instruction sets, wherein the machine learning model is a neural network, wherein iteratively training the machine learning model further comprises:
      using training data applied to an input of nodes comprising at least a plurality of assessments correlated to the plurality of instruction sets, one or more intermediate layers of nodes, and an output layer of nodes comprising at least a quarterly production level;
      adjusting one or more connections and one or more weights between nodes in adjacent layers of the machine learning model, wherein adjusting the one or more connections and one or more weights comprises utilizing a scoring function configured to maximize a probability that an input layer of nodes is associated with the output layer of nodes;
      detecting additional correlations between the output layer of nodes and the input layer of nodes;
      iteratively training the machine learning model as a function of the additional correlations;
   classifying the data describing an assessment of the plurality of assessments to data describing at least some of the plurality of instruction sets using the trained machine learning model;
   generating, by the computing device, an interface query data structure, interface query data structure, wherein:
      the interface query data structure configures a remote display device to display a progression sequence based on classification of elements of data describing assessments of respective instruction sets into at least some of the plurality of instruction sets, the progression sequence is configured to change color or order based on at least the impact datum relative to the entity data;
      the interface query data structure configures the remote display device to receive, at an impact datum field, an updated impact datum from a user;
   retraining the machine-learning model using the updated impact datum by adjusting the plurality of training data connections between layers of the plurality of nodes of the machine-learning model based on the updated impact datum;
   generating an updated classification of the data to describe an updated plurality of instruction sets using the retrained machine-learning model; and
   modifying the interface query data structure using the updated plurality of instruction sets.

18. The method of claim 17, wherein the machine learning model is configured to run iteratively over multiple iterations.

* * * * *